United States Patent
Yokogawa et al.

[19]

[11] Patent Number: 6,137,101
[45] Date of Patent: Oct. 24, 2000

[54] LIGHT RECEIVING AMPLIFYING DEVICE

[75] Inventors: Naruichi Yokogawa, Kashihara; Takanori Okuda, Kashiba; Takayuki Shimizu, Kitakatsuragi-gun, all of Japan

[73] Assignee: Sharp Kabushiki Kaisha, Osaka, Japan

[21] Appl. No.: 09/132,412

[22] Filed: Aug. 11, 1998

[30] Foreign Application Priority Data

Sep. 26, 1997 [JP] Japan ................................. 9-261520

[51] Int. Cl.[7] ................................................ H01J 40/14
[52] U.S. Cl. ............................ 250/214 LA; 250/214 AG; 330/59
[58] Field of Search ................ 250/214 LA, 214 AG, 250/214 A, 214 R, 551; 356/226; 330/59, 308

[56] References Cited

U.S. PATENT DOCUMENTS

| | | | |
|---|---|---|---|
| 5,008,524 | 4/1991 | Reutter et al. | 250/214 A |
| 5,198,658 | 3/1993 | Rydin | 250/214 A |
| 5,600,128 | 2/1997 | Lindstrom | 250/214 AG |
| 5,714,909 | 2/1998 | Jackson | 330/308 |
| 5,734,300 | 3/1998 | Yoder | 330/308 |
| 5,786,730 | 7/1998 | Hadley | 330/59 |

*Primary Examiner*—Que T. Le
*Assistant Examiner*—Thanh X. Luu

[57] ABSTRACT

A light receiving amplifying device includes a light receiving device for outputting a light signal current which varies with a quantity of received light, a load resistor connected with the light receiving device in series, for generating a detected voltage which varies with the light signal current, and a low frequency current bypass circuit for preventing the detected voltage from being saturated when the detected voltage has a frequency in a low frequency band. The low frequency current bypass circuit is connected with the load resistor in parallel and has an input impedance varying with a frequency of the detected voltage. The device further includes a transimpedance amplifying circuit (inverting amplifying circuit) for transforming an impedance of the detected voltage, and a capacitor for coupling the low frequency current bypass circuit and the transimpedance amplifying circuit (inverting amplifying circuit). This makes it possible, with a relatively simple circuit and arrangement in an infrared communication receiver, to lower noises of the light receiving amplifying device while maintaining an operational range with respect to a DC photoelectric current.

20 Claims, 5 Drawing Sheets

DC PHOTOELECTRIC CURRENT

FIG. 9

LIGHT RECEIVING AMPLIFYING DEVICE

FIELD OF THE INVENTION

The present invention relates to a light receiving amplifying device for use in an infrared signal receiver or the like, and particularly relates to a light receiving amplifying device for use in an optical communication device IrDA1.0 or IrDA1.1.

BACKGROUND OF THE INVENTION

Examples of data communication recently performed by the use of infrared include (1) communication by remote control which is the most common one, applied to home electric appliances, and (2) communication by the use of the optical communication devices IrDa1.0 or IrDa1.1 which are standardized peripheral devices for personal computers.

Communication by remote control is one-way communication with a transmission rate of about 1 kbps, and is characterized in that a transmission distance is long (not less than 10 m). On the other hand, the optical communication device IrDA1.0 or IrDA1.1 is characterized in that though it has a short transmission distance of about 1 m, it is capable of transmission of a large quantity of data by two-way communication since it has a transmission rate of 9.6 kbps to 4 Mbps.

It is therefore necessary that the following requirements are satisfied in near future: (i) circuits should have a higher operational speed and higher precision to improve the transmission rate; (ii) devices should have high sensitivity, improved performance, and an expanded range of an operational power source voltage, to prolong the transmission distance; and, (iii) a size of a product package should be reduced. To solve problems inherent to such high-speed and high-sensitive devices and high-precision circuits, a novel technique is hereafter, a direct current removing method applied to a light receiving amplifying device in an infrared receiver and improvement of a signal to noise (S/N) ratio are discussed.

Figure 7:
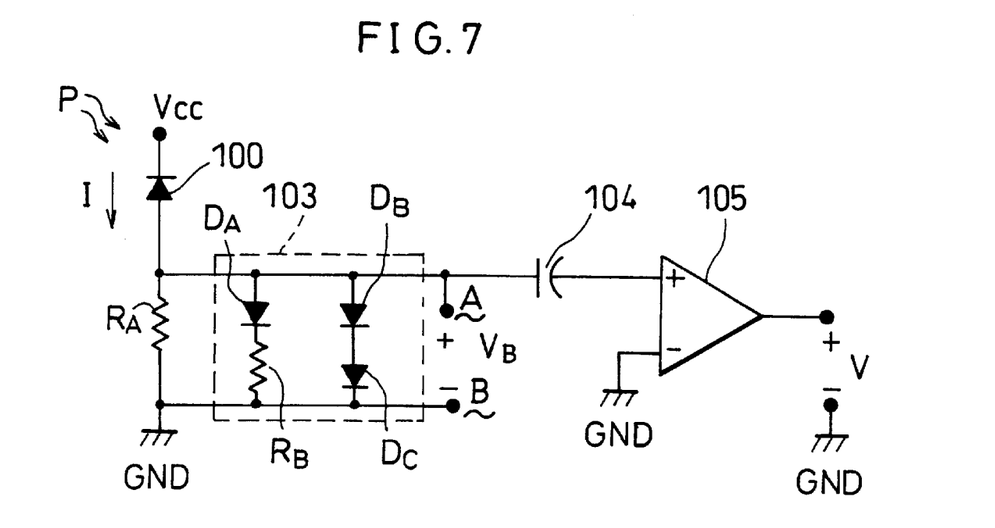
FIG. 7 is an example of a circuit arrangement of a light receiving amplifying section in a conventional receiver for infrared data communication use.

Infrared data communication is prevailing, though still being required to achieve higher speed and higher sensitivity for long-distance transmission. FIG. 7 is a circuit diagram showing an example of a light receiving amplifying device of a conventional receiver for infrared data communication use. This is a main circuit diagram of "Infrared Receiver with Variable Input Resistance for Optical Communication Systems" disclosed by the U.S. Pat. No. 5,600,128 (Date of Patent: Feb. 4, 1997).

As shown in FIG. 7, a cathode of a light receiving device 100 is connected with a power source $V_{CC}$, while an anode of the light receiving device 100 is connected with a ground terminal (GND) with a load resistor $R_A$ provided therebetween. A low frequency current bypass circuit 103 is connected with the load resistor $R_A$ in parallel. The low frequency current bypass circuit 103 is composed of a circuit (1) in which a diode $D_A$ and a resistor $R_B$ are connected in series, and a circuit (2) in which a diode $D_B$ and a diode $D_C$ are connected in series, the circuits (1) and (2) being connected in parallel. The low frequency current bypass circuit 103 is connected with an amplifier 105 through a capacitor 104.

The following description will explain an operation of the foregoing circuit. In qualitative explanations, in the case where only an AC signal is present but DC light is absent, incident optical power P is converted to a light signal current by the light receiving device 100, and the light signal current I thus obtained by conversion is further converted to a voltage by the load resistor $R_A$, thereby generating a detected voltage $V_B$ across terminals A and B. The detected voltage $V_B$ is sent through the capacitor 104 to the amplifier 105, where the voltage is amplified. If the amplifier 105 has a sufficiently high input impedance in the present conventional case, an input signal Vin to the amplifier 105 becomes an AC component of the detected voltage $V_B$ without any change.

Subsequently, the DC component of the light signal current increases, thereby causing a DC voltage of the detected voltage $V_B$ to increase. When the DC component of the detected voltage $V_B$ reaches a certain voltage level V1, the Diode $D_A$ starts operating (turned ON), thereby allowing the current to flow through the resistor $R_B$ as well. This causes a composite resistance between the terminals A and B to decrease. As a result, the incremental change in the detected voltage $V_B$ decreases, and a signal supplied to the amplifier 105 via the capacitor 104 also diminishes, causing a signal amplified by the amplifier 105 to have a smaller amplitude.

When the $D_C$ component of the light signal current further increases and reaches a voltage level V2, the diode $D_B$ and the diode $D_C$ start operating, and a composite resistance between the terminals A and B becomes substantially determined by respective ON resistance of the diodes $D_B$ and $D_C$. Since the composite resistance between the terminals A and B thus decreases, the incremental change in the detected voltage $V_B$ further decreases, and becomes substantially constant at around the voltage level V2. Accordingly, the input signal supplied to the amplifier 105 through the capacitor 104 diminishes, thereby causing a signal obtained by amplification to have a smaller amplitude.

Figure 8:
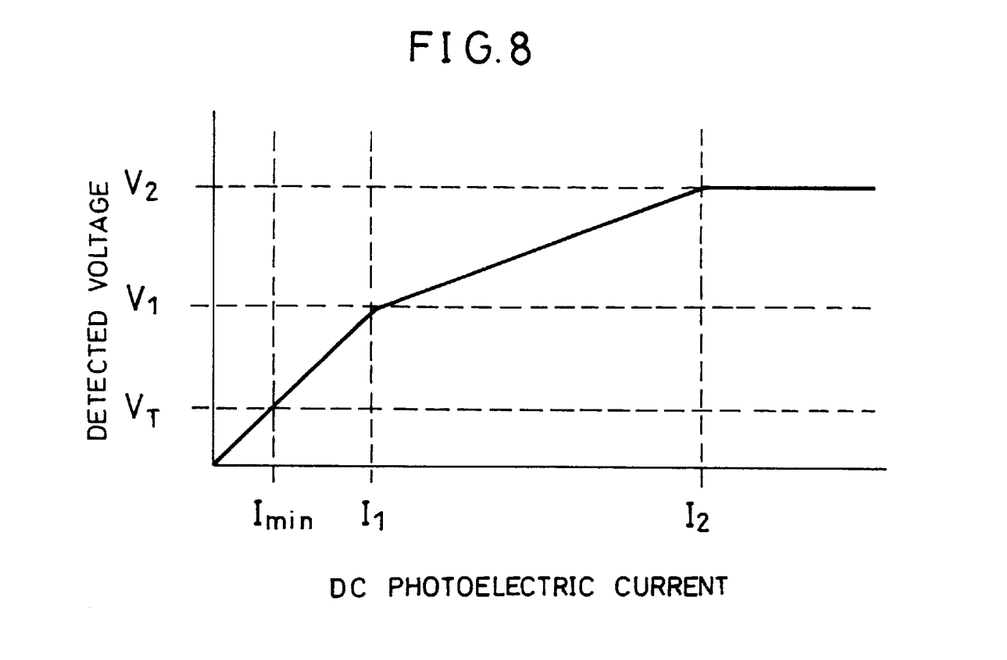
FIG. 8 is a view explaining an operation with respect to direct current by the light receiving amplifying section in the conventional receiver for infrared data communication use.

This is plotted in FIG. 8. As shown in FIG. 8, in the present conventional case, the resistance (composite resistance between the terminals A and B) which consequently constitutes a load is gradually lowered so that an operational range with respect to the direct current is ensured, so as to cover the incremental change in the DC component of the light signal current. Incidentally, VT in FIG. 8 represents a minimum voltage necessary for operation.

Regarding a relationship between the detected voltage and the optical signal current, the following description will explain amperage and voltage at each turning point of the relationship by using formulas, while referring to FIG. 8. In FIG. 8, a detected voltage V1 is a voltage which causes the diode $D_A$ to start operating (turned ON), and therefore it can be expressed as a rise voltage $V_{BE}$ of the diode $D_A$, which is about 0.7V. A detected voltage V2 is a voltage which causes both the diodes $D_B$ and $D_C$ to start operating (turned ON), and is expressed by a sum of rise voltages of the diodes $D_B$ and $D_C$, that is, ($V_{BE}$ and $V_{BE}$), which is about 1.4V.

When V1 is produced across the terminals A and B as a detected voltage, a light signal current I1 is expressed as:

$$I1 \approx 0.7V/R_A \qquad (10)$$

Further, since current flows through both the load resistors $R_A$ and the resistor $R_B$ in the case where the light signal current is in a range of I1 to I2 in FIG. 8, a light signal current I2 is expressed as:

$$I2 \approx I1 + 0.7/(R_A \times R_B/(R_A + R_B)) \qquad (11)$$

In the circuit of the conventional receiver, however, in the case where the resistance of the load resistor is set too great, the receiver becomes inferior in response, because a time constant which is a product of the resistance and an inner capacitance Cpd of the light receiving device becomes great, thereby resulting in that its response speed becomes lower so as not to follow the change of an inputted signal. Therefore, it is necessary to make the load resistor $R_A$ have a relatively small load resistance. On the other hand, in the case where the load resistor $R_A$ has a too small load resistance, there arises a problem that a thermal noise current produced by the load resistor $R_A$ cannot be suppressed. Therefore, the load resistor $R_A$ should have an adequate load resistance. Taking as an example the optical communication device IrDA1.1 that is the current infrared communication standard, to satisfy requirements regarding photo-sensitivity and response speed, the device should substantially satisfy the following conditions:

Cpd≈25 [pF]

fc≈6 [MHz]

condition of fc: 3 dB bandwidth

To achieve such response speed, the load resistance of the load resistor $R_A$ should satisfy a condition expressed by the following formula (12):

$$R_A < 1/(2\pi \cdot fc \cdot Cpd) \approx 1.06 \, [k\Omega] \quad (12)$$

Therefore, in this case, the load resistance of the load resistor $R_A$ cannot be set to or higher than 1 kΩ. On the other hand, to achieve high sensitivity for long-distance communication, it is necessary to lower the noise of the light receiving amplifying device, and to lower the noise, it is necessary to set the load resistance of the load resistor $R_A$ as great as possible. This is because a thermal noise current Inr caused due to a load resistance R, among equivalent noise referred to input of the light receiving amplifying device, is expressed as:

$$Inr = (4KT/R)^{1/2} \, [A/Hz^{1/2}] \quad (13)$$

where K, T, and R represent Boltzmann's constant (1.38× $10^{-23}$), absolute temperature [K], and a load resistance, respectively.

Therefore, in the case where the load resistance is 1 kΩ, Inr at room temperature is found as:

$$Inr = (4 \times (1.38 \times 10^{-23}) \times 300/1000) \approx 4.07 \, [pA/Hz^{1/2}]$$

Figure 9:
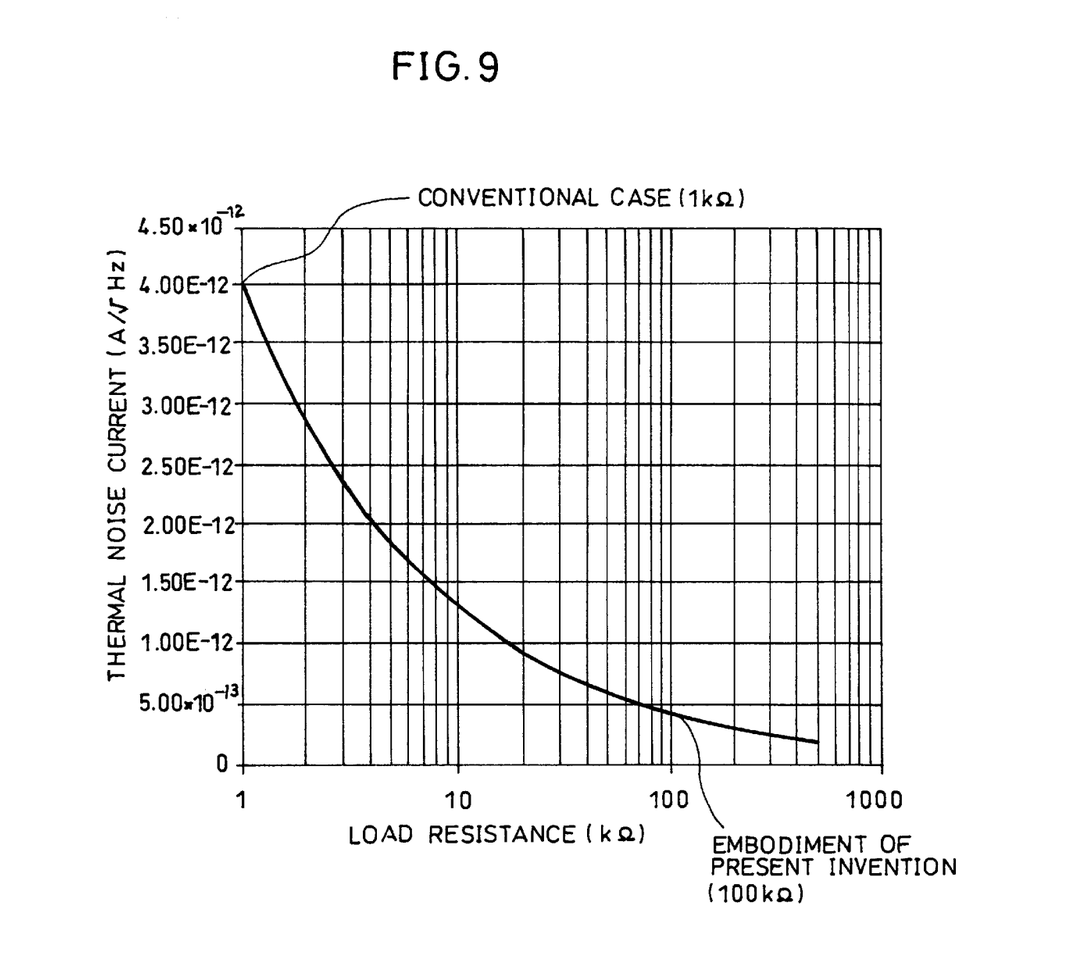
FIG. 9 is a view illustrating relationship between a thermal noise current Inr and a load resistance R which is expressed by the formula (13).

Therefore, in the above example, it is impossible to make the noise lower than 4.07. The relationship between the thermal noise current Inr and the load resistance R, expressed by the foregoing formula (13), is shown in FIG. 9.

Nowadays, however, to suppress the noise to a level of 1 $[pA/Hz^{1/2}]$ to 2 $[pA/Hz^{1/2}]$ is demanded, and therefore, improvement of the circuit is imperative. To achieve this object, usually employed is a technique wherein input impedance on the amplifier side is lowered so that the amplifier is used as transimpedance amplifier, thereby ensuring that the resistor $R_A$ of the light receiving device is made to have a great resistance. However, there is a drawback in that an operational range with respect to the DC light current is diminished when the resistor $R_A$ has a great resistance. Therefore, difficulty in ensuring the operational range of the DC light current is the greatest obstacle to clear, in improving the infrared receiver.

SUMMARY OF THE INVENTION

The object of the present invention is to provide such a light receiving amplifying device that a load resistance thereof can be made greater while an operational range thereof with respect to an input signal of a low frequency component can be expanded.

To achieve the object, the light receiving amplifying device of the present invention comprises (1) a light receiving device for outputting a light signal current which varies with quantity of received light, (2) a load resistor, connected with the light receiving device in series, for generating a detected voltage which varies with the light signal current, (3) a low frequency current bypass circuit, being connected with the load resistor in parallel and having an input impedance varying with a frequency of the detected voltage, for preventing the detected voltage from being saturated in the case where the frequency of the detected voltage is in a low frequency band, (4) a transimpedance amplifying circuit for transforming an impedance of the detected voltage, and (5) a capacitor for coupling the low frequency current bypass circuit and the transimpedance amplifying circuit.

With the foregoing arrangement, the light signal current from the light receiving device flows to the load resistor, where the detected voltage is generated in accordance with the quantity of received light. The detected voltage is sent to the low frequency current bypass circuit. The low frequency current bypass circuit processes the detected voltage so that the detected voltage does not become saturated if it is in the low frequency band. The detected voltage thus processed is sent through the capacitor to the transimpedance amplifying circuit, where the impedance of the detected voltage is transformed, and thereafter outputted. On the other hand, the low frequency current bypass circuit exhibits a high input impedance with respect to a detected voltage in a high frequency band, and in this case, the detected voltage is sent to the transimpedance amplifying circuit through the capacitor without passing through the low frequency current bypass circuit. Then, the impedance of the detected voltage is transformed by the transimpedance amplifying circuit and outputted.

As described above, the provision of the transimpedance amplifying circuit ensures that the resistance of the load resistor is set considerably greater than the resistance (about 1 kΩ) of the conventional cases. Moreover, since the low frequency current bypass circuit is further provided, the detected voltage increases without becoming saturated even in the case where the light signal current has a great DC component. In other words, when the load resistor has a great resistance, the operational range with respect to the DC light current can be expanded. Accordingly, a sufficient operational range with respect to the DC light current can be ensured.

For a fuller understanding of the nature and advantages of the invention, reference should be made to the ensuing detailed description taken in conjunction with the accompanying drawings.

BRIEF DESCRIPTION OF THE DRAWINGS

FIGS. 3(a) and 3(b) are concrete examples of the low frequency current bypass circuit in the light receiving amplifying device in accordance with the embodiment of the present invention. FIG. 3(a) shows an example in which a low-pass filter circuit is composed of a split resistor $R_1$ and a capacitor $C_1$ which are connected in series, while a transconductance amplifier is composed of an NPN transistor $Q_{N1}$ and a split resistor $R_2$. FIG. 3(b) is an example which is identical to that in FIG. 3(a) except that, in lieu of the transistor $Q_{N1}$, a MOS transistor $M_{N1}$ is used.

DESCRIPTION OF THE PREFERRED EMBODIMENTS

Figure 1:
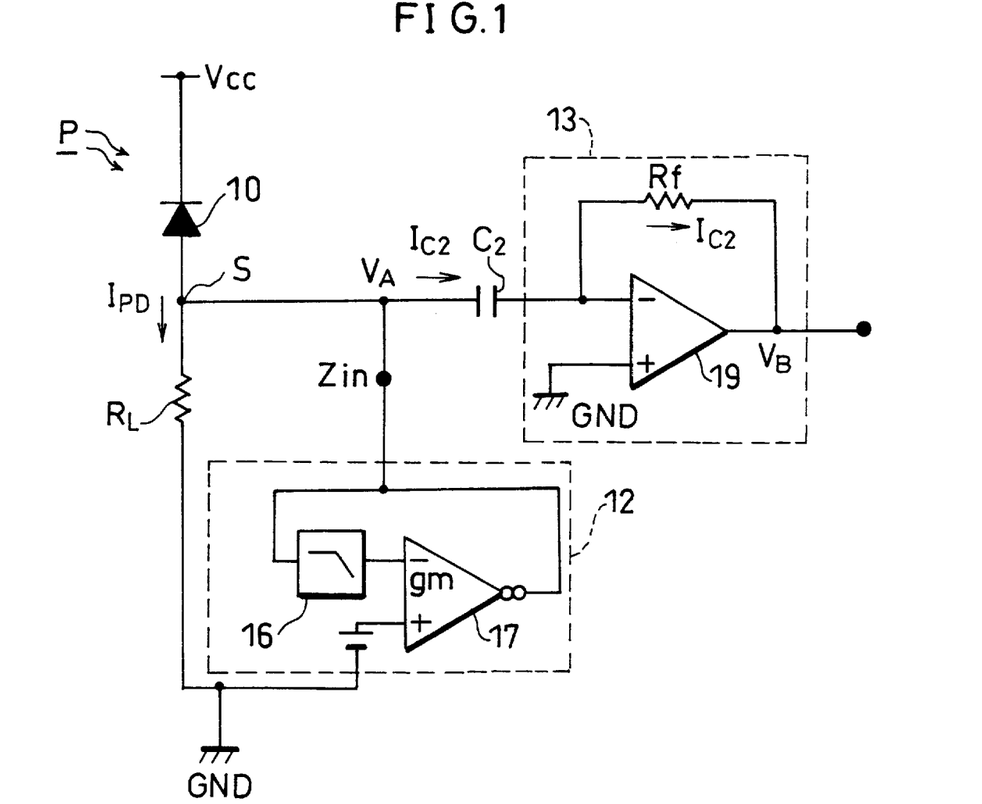
FIG. 1 is an equivalent circuit diagram of a light receiving amplifying device in accordance with an embodiment of the present invention.

FIGS. 1 through 6 are views relating to an embodiment of the present invention, and the following description explains the embodiment while referring to these figures. FIG. 1 is an equivalent circuit diagram of a light receiving amplifying device in accordance with the embodiment of the present invention.

As shown in FIG. 1, a light receiving device 10 for outputting a current signal (light signal current) which varies with a received light quantity has a cathode connected with a power source $V_{CC}$ and an anode connected with a ground terminal (GND) through a load resistor $R_L$ provided therebetween. A low frequency current bypass circuit 12 (described later) is also connected with the load resistor $R_L$ in parallel. A node S at which the light receiving device 10 is connected with the load resistor $R_L$ is also connected with a transimpedance amplifying circuit (inverting amplifying circuit) 13, through a capacitor $C_2$ provided therebetween.

The transimpedance amplifying circuit (inverting amplifying circuit) 13 is provided for transforming an impedance of the light receiving device 10. In the transimpedance amplifying circuit (inverting amplifying circuit) 13, an inverting input terminal and an output terminal of an operational amplifier 19 are connected with each other through an equivalent transimpedance Rf provided therebetween, while a non-input terminal is grounded.

The following description will explain an operation of the foregoing circuit as the light receiving amplifying device. In qualitative explanations, in the case where DC light is absent but only an AC light signal is present, light P incident on the light receiving device 10 is converted to a light signal current $I_{PD}$ which varies with a received light quantity, which is in turn converted to a detected voltage $V_A$ by the load resistor $R_L$. The detected voltage $V_A$ is supplied, as a photoelectric current $I_{C2}$, through the capacitor $C_2$ to the transimpedance amplifying circuit (inverting amplifying circuit) 13.

The transimpedance amplifying circuit (inverting amplifying circuit) 13 has a sufficiently low impedance, as compared with that of the load resistor $R_L$ or that of the capacitor $C_2$. Therefore, an AC signal component of the photoelectric current $I_{c2}$ flows into the transimpedance amplifying circuit (inverting amplifying circuit) 13 through the capacitor $C_2$, thereby, due to the equivalent transimpedance Rf, causing the transimpedance amplifying circuit (inverting amplifying circuit) 13 to generate and output a voltage. Here, for conveniences' sake, an impedance of the capacitor $C_2$ with respect to frequency components treated herein is set sufficiently lower than that of the load resistor $R_L$.

In the present invention, theoretically a resistance of the load resistor $R_L$ can be substantially increased by supplying an AC component of the detected voltage $V_A$ to the transimpedance amplifying circuit (inverting amplifying circuit) through the capacitor $C_2$, and in so doing, a thermal noise current in accordance with the resistance of the load resistor $R_L$ can be reduced.

In the case where the resistance of the load resistor $R_L$ is simply increased, however, an operational range with respect to the DC component of the light signal current $I_{PD}$ is diminished. Then, in the present invention, the problem is solved by providing a low frequency current bypass circuit 12 for bypassing a low frequency component of the light signal current $I_{PD}$ so as to be in parallel with the load resistor $R_L$.

Here, the structure of the low frequency current bypass circuit 12, the operational principle of the low frequency current bypass circuit 12 with respect to the DC component of the light signal current $I_{PD}$ will be explained below, with reference to FIG. 2.

Figure 2:
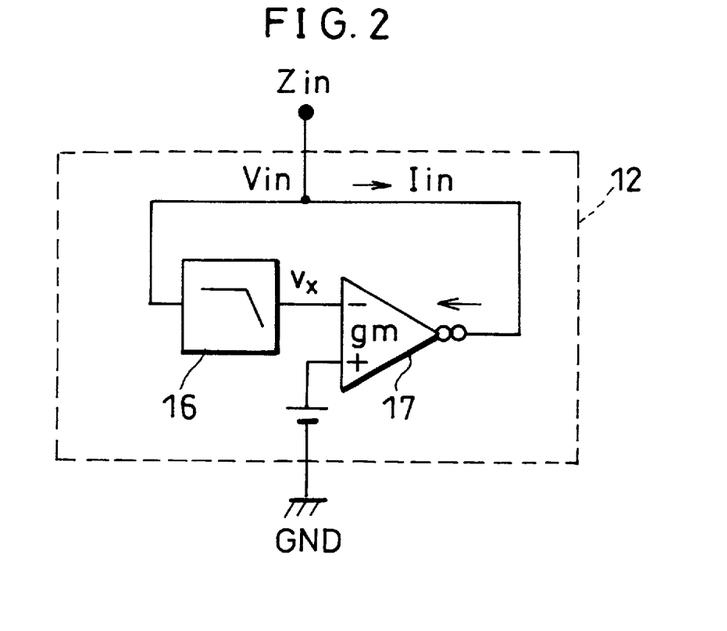
FIG. 2 is a block diagram illustrating principles of a low frequency current bypass circuit in the light receiving amplifying device in accordance with the embodiment of the present invention.

The low frequency current bypass circuit 12 is composed of a low-pass filter circuit 16 and a transconductance amplifier 17, as shown in FIG. 2, and the detected voltage $V_A$ is supplied to the low-pass filter circuit 16 as an input voltage $V_{in}$. An output voltage $V_X$ of the low-pass filter circuit 16 is supplied to an inverting input terminal of the transconductance amplifier 17. The non-inverting input terminal of the transconductance amplifier 17 is grounded through a power source.

Incidentally, in FIG. 1, let an output voltage of the transimpedance amplifying circuit (inverting amplifying circuit) 13 (operational amplifier 19) be $V_B$, and $V_B$ is expressed as:

$$V_B = -Rf \times I_{C2}$$

Therefore, the detected voltage $V_A$ at the node S is proportional to the current $I_{C2}$ which flows through the capacitor $C_2$ to the transimpedance amplifying circuit (inverting amplifying circuit) 13, and the output voltage $V_B$ becomes a voltage, resulting in a multiplication of the current $I_{C2}$ by $-Rf$ appearing. Simultaneously, aside from the current $I_{C2}$, a thermal noise current is also generated at the node S due to the load resistor $R_L$. The thermal noise current is likewise multiplied by $-Rf$ and is outputted from the transimpedance amplifying circuit (inverting amplifying circuit) 13.

Therefore, a total noise of the system is determined by the quantity of the thermal noise current generated at the node S.

Since relationship between the resistance of the load resistor $R_L$ and the thermal noise current Inr caused by the load resistor $R_L$ is expressed as the foregoing formula (13), the thermal noise current Inr is consequently in inverse proportion to a square root of the resistance of the load resistor $R_L$ as shown in FIG. 9. In short, as the resistance of the load resistor $R_L$ is greater, the thermal noise current Inr is smaller.

More specifically, in the conventional example, the thermal noise current Inr is about 4 $[pA/Hz^{1/2}]$ in the case where the load resistor $R_L$ has a resistance of 1 kΩ. On the other hand, in the case of the present invention, since the resistance of the load resistor $R_L$ can be set to about 100 kΩ, the thermal noise current Inr becomes about 0.4 $[pA/Hz^{1/2}]$, according to the formula (13). Thus, the thermal noise current is reduced to $\frac{1}{10}$ or less of that in the conventional example.

The following description will explain an operational principle of the low frequency current bypass circuit 12, while referring to the block diagram of FIG. 2 and using some formulas.

An output voltage $V_X$ of the low-pass filter circuit 16 is, as shown in FIG. 2, applied to the inverting input terminal of the transconductance amplifier 17, while the output terminal of the transconductance amplifier 17 and an input terminal of the low-pass filter circuit 16 are connected with each other. Thus an impedance Zin obtained when viewing from the input side of the low-pass filter circuit 16 is low with respect to a low frequency band. From FIG. 2, the frequency property of the impedance Zin is expressed by the following two formulas (14) and (15):

$$v_X = Vin \times G/(1+s\tau) \quad (14)$$

$$Iin = v_X \times gm \quad (15)$$

where:
G: amplifying ratio of the low-pass filter circuit 16,
s: Laplace operator (S=jω, ω: angular frequency),
τ: time constant of the low-pass filter circuit 16,
$V_X$: input voltage of the transconductance amplifier 17, and
gm: conductance of the transconductance amplifier 17.

According to the formulas (14) and (15), the input impedance Zin is expressed as:

$$Zin = Vin/Iin = (1+s\tau)/(G \times gm) \quad (16)$$

Here, let G=1, and the input impedance Zin is found as:

$$Zin = (1+s\tau)/gm \quad (17)$$

Clear from the formula (17), the low frequency current bypass circuit 12 has an input impedance close to a reciprocal of the conductance gm with respect to an input signal in the low frequency band, and has an impedance equal to the reciprocal of the conductance gm with respect to a direct current. In contrast, as the angular frequency ω becomes higher, the input impedance Zin becomes greater in proportion to the angular frequency (that is, a frequency of the input signal), thereby becoming a high input impedance. In other words, the low frequency current bypass circuit 12 has a low impedance with respect to input signals in that low frequency band including a DC input signal, whereas it has a high input impedance with respect to input signals with high frequencies.

Figure 3A:
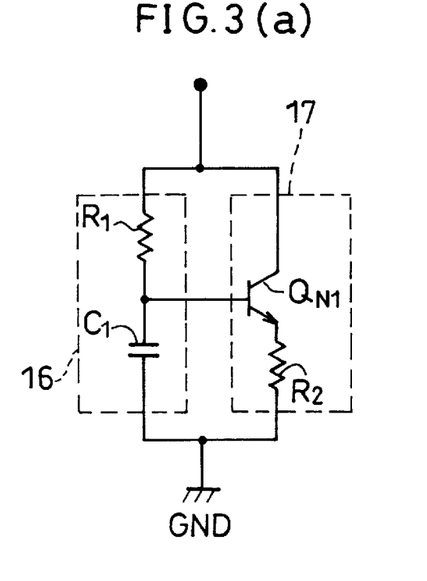
Figure 3B:
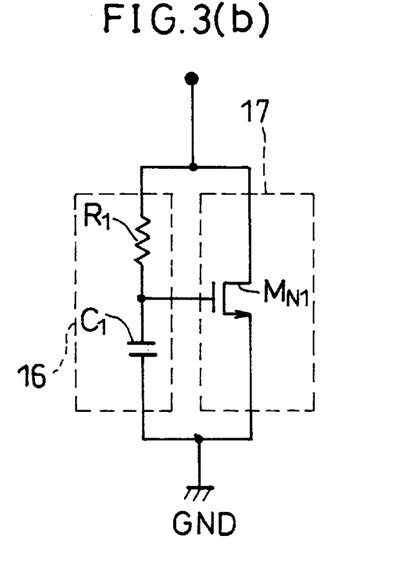

FIGS. 3(a) and 3(b) show concrete circuit arrangement examples of the low frequency current bypass circuit 12 in the light receiving amplifying device in accordance with the embodiment of the present invention. FIG. 3 (a) corresponds to an arrangement explained using FIG. 1, while FIG. 3(b) shows an arrangement wherein a MOS transistor $M_{N1}$ is used in lieu of a transistor $Q_{N1}$ and a split resistor $R_2$ of FIG. 3(a).

As shown in FIG. 3(a), the low-pass filter circuit 16 is composed of a split resistor $R_1$ and a capacitor $C_1$ which are connected in series. Therefore, the time constant τ of the low-pass filter circuit 16 which appears in the formula (17) is ($R_1 \times C_1$). Besides, the transconductance amplifier 17 is composed of an NPN transistor $Q_{N1}$ and a split resistor $R_2$, and hence the conductance gm thereof is substantially equal to $1/R_2$. As a result, the input impedance Zin expressed by the formula (17) is found as:

$$Zin = (1+sR_1C_1) \times R_2 \quad (18)$$

Therefore, the low-pass filter circuit 16 of FIG. 3(a) has an input impedance Zin equal to $R_2$ with respect to a DC input signal. As the input signal has a higher frequency, the input impedance Zin thereof with respect to the input signal increases according to the coefficient $R_1C_1$, thereby causing substantially no current to flow thereto.

Subsequently, when a DC voltage of the detected voltage $V_A$ becomes higher in response to an increase in a DC component of the light signal current $I_{PD}$, thereby reaching a certain voltage level V1, the transistor $Q_{N1}$ starts operating (current flows into the transistor $Q_{N1}$), and current also starts flowing into the split resistors $R_1$ and $R_2$. With this, resistance components in these portions decrease (since a composite resistance across the both ends of a circuit formed by connecting the transistor $Q_{N1}$ and the split resistor $R_2$ in series decreases), changes in the detected voltage $V_A$ become smaller.

In the low frequency current bypass circuit 12 of the present invention, unlike the conventional case, the low-pass filter circuit 16 is composed of the split resistor $R_1$ and the capacitor $C_1$, and therefore, the transistor $Q_{N1}$ operates to respond to a current (input signal) in the low frequency band. On the other hand, the transistor $Q_{N1}$ does not operate with respect to the light signal current $I_{PD}$ with a high frequency which should be received (for example, a frequency of not less than several hundreds of kHz), since an amplitude of an input signal of such a frequency supplied to a base of the transistor $Q_{N1}$ declines due to effects of the low-pass filter circuit 16 composed of the split resistor $R_1$ and the capacitor $C_1$. Therefore, the operation with respect to the input signal with a frequency in the high frequency band is equivalent to an operation in the case where the low-pass filter circuit 16 is absent.

In FIG. 3(b), the transconductance amplifier 17 is composed of a MOS transistor $M_{N1}$, and the conductance gm is therefore a conductance gmmn1 of the transistor $M_{N1}$. Accordingly, the input impedance Zin expressed by the formula (17) is found as:

$$Zin = (1+sR_1C_1)/gmmn1 \quad (19)$$

Description on a circuit operation in this case is omitted since the circuit operation in this case is identical to that in the case of FIG. 3(a).

Figure 4:
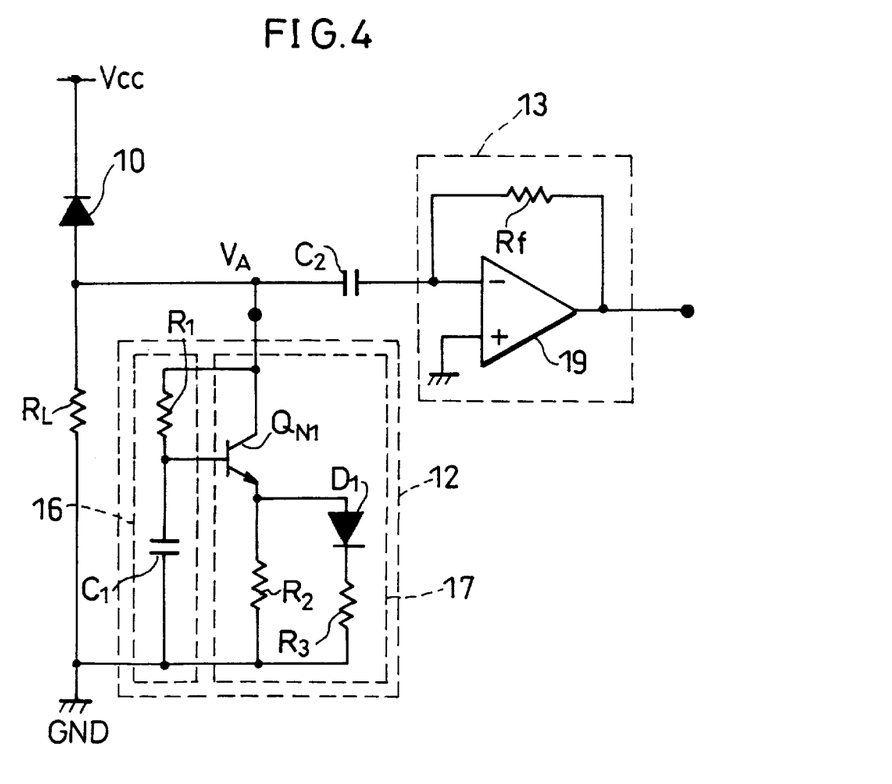
FIG. 4 is a concrete example of the low frequency current bypass circuit in the light receiving amplifying device in accordance with the embodiment of the present invention, in which the low-pass filter is composed of the split resistor $R_1$ and the capacitor $C_1$ which are connected in series, while the transconductance amplifier is composed of the NPN transistor $Q_{N1}$, the split resistor $R_2$, a diode, and a resistor.

FIG. 4 is another concrete circuit arrangement example of the light receiving amplifying device of the present invention, particularly showing another circuit arrangement example of the low frequency current bypass circuit 12. In this, a circuit composed of a clamping diode $D_1$ and a resistor $R_3$ which are connected with each other in series is connected in parallel with the split resistor $R_2$ of the transconductance amplifier 17 shown in FIG. 3(a). This is intended to cause a conductance of the transconductance amplifier 17 of the low frequency current bypass circuit 12 to gradually vary with the DC voltage of the detected voltage $V_A$.

FIG. 4 shows an example of the transconductance amplifier 17 in which a circuit composed of the clamping diode $D_1$ and the resistor $R_3$ which are connected with each other in series is connected with the split resistor $R_2$ in parallel, but the present invention should not be limited to this. The transconductance amplifier 17 may have a structure in which a plurality of circuits each being composed of clamping diodes and resistors which are connected in series are further connected in parallel with the split resistor $R_2$. In this case, since each clamping voltage of the parallelly connected circuits is determined depending on the number of the diodes connected in series, the number of diodes in each circuit thus further provided may be determined depending on necessity. In addition, so is each resistance of the resistors which are connected with the diodes in series in each circuit. Further, needless to say, one or a plurality of diodes may be provided so as to be connected in series or in parallel, when necessary.

In the case of FIG. 4, as the DC voltage of the detected voltage $V_A$ increases in response to an increase in the DC component of the light signal current $I_{PD}$, a voltage across the split resistor $R_2$ increases, thereby turning the diode $D_1$ ON. This causes current to flow through the resistor $R_3$, and an AC conductance gm of the transconductance amplifier 17 of the low frequency current bypass circuit 12 is determined by a composite resistance in the case where the split resistor $R_2$ and the resistor $R_3$ are provided in parallel. Therefore, the conductance gm is expressed as:

$$gm = R_2 \times R_3 / (R_2 + R_3) \quad (20)$$

Figure 5:
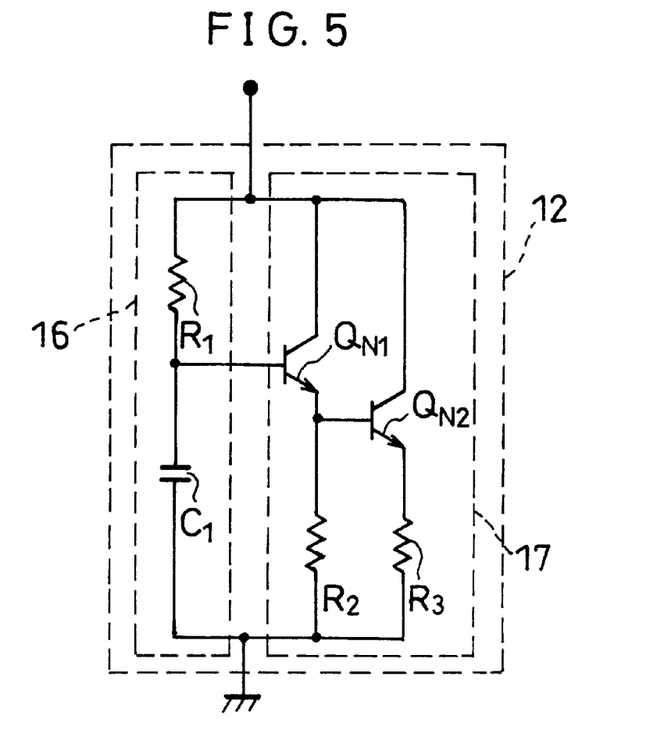
FIG. 5 is a concrete example of the low frequency current bypass circuit in the light receiving amplifying device in accordance with the embodiment of the present invention, in which the low-pass filter is composed of the split resistor $R_1$ and the capacitor $C_1$ which are connected in series, while the transconductance amplifier is composed of the NPN transistor $Q_{N1}$, the split resistor $R_2$, an NPN transistor $Q_{N2}$ and a resistor.

FIG. 5 is another concrete circuit arrangement example of the low frequency current bypass circuit of the light receiving amplifying device in accordance with the embodiment of the present invention, in which a circuit composed of an NPN transistor $Q_{N2}$ and the resistor $R_3$ which are connected in series is provided in lieu of the circuit, shown in FIG. 4, composed of the clamping diode $D_1$ and the resistor $R_3$ which are connected in series. Regarding the NPN transistor $Q_{N2}$, a collector thereof is connected with a collector of the transistor $Q_{N1}$, a base thereof is connected with an emitter of the transistor $Q_{N1}$, and an emitter thereof is grounded through the resistor $R_3$. With this arrangement, base current errors occurring to the transistor $Q_{N1}$ can be reduced.

The following description will explain the reason why the base current errors occurring to the transistor $Q_{N1}$ can be reduced with the arrangement shown in FIG. 5.

In the arrangement shown in FIG. 4, let a base current of the transistor $Q_{N1}$ be "$I_{B1}$", a current flowing through the split resistor $R_2$ "$I_2$", a current flowing through the resistor $R_3$ "$I_3$", a corrector current of the transistor $Q_{N1}$ "$I_{C1}$", and a current amplifying ratio of the transistor $Q_{N1}$ be "$h_{fe}$". With $I_{C1} \approx I_2 + I_3$ and $I_{B1} = I_{C1}/h_{fe}$, $I_{B1}$ is expressed as:

$$I_{B1} \approx (I_2 + I_3)/h_{fe} \quad (a)$$

On the other hand, in the arrangement shown in FIG. 5, let a base current of the transistor $Q_{N1}$ be "$I_{B1}$", a base current of the transistor $Q_{N2}$ "$I_{B2}$", a current flowing through the split resistor $R_2$ "$I_2$", a current flowing through the resistor $R_3$ "$I_3$", a corrector current of the transistor $Q_{N1}$ "$I_{C1}$", and a current amplifying ratio of the transistor $Q_{N1}$ be "$h_{fe}$". With $I_{C1} \approx I_2 + I_{B2}$, $I_{B1} = I_{C1}/h_{fe}$, and $I_{B2} = I_3/h_{fe}$, $I_{B1}$ is expressed as:

$$I_{B1} = I_{C1}/h_{fe} \approx (I_2 + I_{B2})/h_{fe} = (I_2 + (I_3/h_{fe}))/h_{fe} \quad (b)$$

As is clear from comparison of the expression (b) with the expression (a), $I_3$ in the expression (a) corresponds to $(I_3/h_{fe})$ in the expression (b), and this means that the transformation of the arrangement of FIG. 4 to that of FIG. 5 reduces $I_3$ to $(1/h_{fe})$ times the same. Therefore, as compared with the arrangement shown in FIG. 4, the base current errors of the transistor $Q_{N1}$ decreases for the foregoing reduction in the case of the arrangement shown in FIG. 5. Note that the current amplifying ratio $h_{fe}$ is about 100 to 200.

Figure 6:
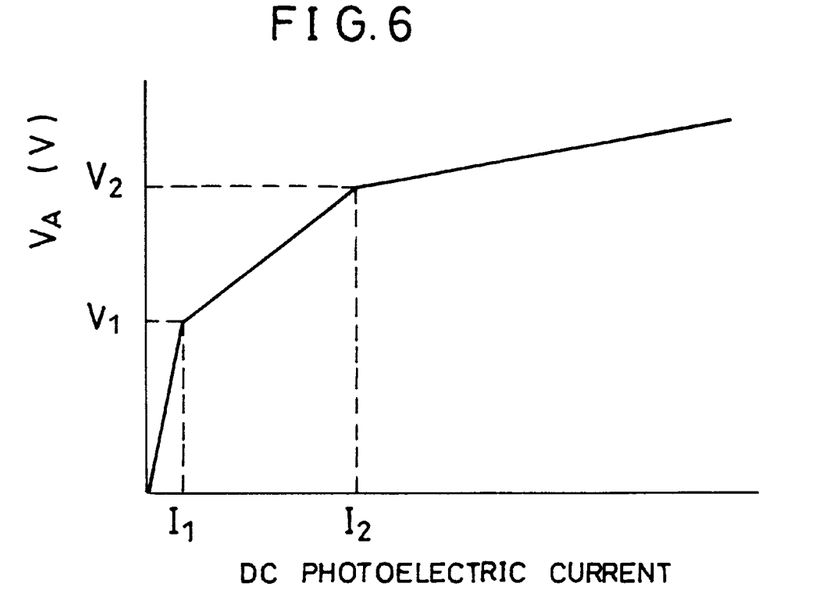
FIG. 6 is a graph showing a DC operation of the low frequency current bypass circuit shown in FIG. 4 for use in the light receiving amplifying device in accordance with the embodiment of the present invention.

FIG. 6 is a graph for explanation of a DC operation of the low frequency current bypass circuit 12 shown in FIG. 4. In the conventional example shown in FIG. 8, a detected voltage $V_B$ is saturated with respect to a light signal current with an amperage equal to or higher than I2, that is, in a high amperage region. However, in the case of FIG. 6, the detected voltage $V_A$ is not saturated even in the high amperage region of not lower than I2, and gradually increases as the DC light current increases. Therefore, the operational range with respect to the DC light signal current can be expanded even in the case where the load resistor $R_L$ has a great resistance it is possible to make the infrared receiver to have a sufficient operational range with respect to the DC light signal current.

The following description will explain amperage and voltage at each turning point of the relationship therebetween by using formulas. When the DC component of the light signal current increases thereby causing the detected voltage $V_A$ to reach a voltage level V1 as shown in FIG. 6, the NPN transistor $Q_{N1}$ shown in FIG. 4 starts operating (turned ON). The voltage V1 corresponds to a voltage $V_{BE}$ across the base and the emitter, which is about 0.7 V. Here, the DC photoelectric current (DC component of the photoelectric current) is $I_1$.

When the DC component of the light signal current further increases thereby causing the detected voltage $V_A$ to reach a voltage level V2, the diode $D_1$ starts operating (turned ON), and this means that the voltage V2 is a sum of a rise voltage of the NPN transistor $Q_{N1}$ and a rise voltage of the diode $D_1$. To explain this using formulas, the current I1 is expressed as:

$$I1 \approx 0.7V/R_L \quad (21)$$

Since current flows through the resistors $R_L$ and $R_1$ both when the DC photoelectric current is in the range of I1 to I2, I2 is expressed as:

$$I2 \approx I1 + 0.7V/(R_L \times R_1/(R_L + R_1)) \quad (22)$$

Thus, with the arrangement of the transconductance amplifier 17 of the low frequency current bypass circuit 12 of the present invention, an operational range with respect to DC photoelectric current which is substantially equal to the operational range in the conventional cases can be ensured, while the detected voltage $V_A$ is not saturated even in a high amperage region of not lower than I2, and gradually increases as the DC photoelectric current increases.

For example, with the circuit arrangement of the light receiving amplifying device in accordance with the embodiment of the present invention shown in FIG. 3(a) or 3(b), the resistance of the load resistor $R_L$ of the light receiving device may be set considerably greater than that in the conventional cases. Even in the case where it is set to, for example, about 100 kΩ, the circuit can operate while maintaining an appropriate response speed. A thermal noise Inr due to a load resistor having a resistance of 100 kΩ is found as follows using the foregoing formula (13):

$$Inr = (4 \times (1.38 \cdot 10^{-23}) \times 300/100000)^{1/2} \approx 0.407 \; [pA/Hz^{1/2}]$$

Thus, it is possible to lower the noise as compared with the conventional cases.

As has been so far described, the light receiving amplifying device of the present invention, having a light receiving device for generating a light signal current and a circuit for amplifying the light signal current, is characterized in that (1) the circuit for amplifying the light signal current includes a low frequency current bypass circuit and a transimpedance amplifying circuit (inverting amplifying circuit), and (2) the light receiving device is connected with a load resistor in series, so that the light signal current is converted to a voltage by the load resistor and supplied to the low frequency current bypass circuit, and an output of the low frequency current bypass circuit is supplied to the transimpedance amplifying circuit (inverting amplifying circuit) through a capacitor.

In the foregoing light receiving amplifying device, the load resistor ($R_L$) is allowed to have a great resistance, and as a result, the thermal noise current is reduced. Thus, such a light receiving amplifying device that the noise is lowered whereas the operational range with respect to the DC component of the light signal current ($I_{PD}$) can be expanded is provided.

The foregoing light receiving amplifying device is preferably arranged so that (1) the low frequency current bypass circuit includes a low-pass filter circuit having input and output terminals and a transconductance amplifier having an inverting input terminal and an output terminal, and (2) the output terminal of the low-pass filter circuit is connected with the inverting input terminal of the transconductance amplifier, and the output terminal of the transconductance amplifier is connected with the input terminal of the low-pass filter circuit, so that an input impedance of the low-pass filter circuit is low with respect to an input thereto in a low frequency band.

With the foregoing arrangement of the light receiving amplifying device, it is possible to obtain a sufficient operational range with respect to the DC component of the light signal current ($I_{PD}$), while forming the low frequency current bypass circuit in a simple circuit arrangement.

The low-pass filter circuit is preferably an RC low-pass filter circuit composed of a resistor and a capacitor, and the transconductance amplifier is preferably composed of at least one bipolar transistor and a resistor.

With the foregoing arrangement of the light receiving amplifying device, it is possible to obtain a sufficient operational range with respect to the DC component of the light signal current ($I_{PD}$), while forming the low frequency current bypass circuit in a simple circuit arrangement.

The low-pass filter circuit is preferably an RC low-pass filter circuit composed of a resistor and a capacitor, and the transconductance amplifier is preferably composed of a MOS transistor.

With the foregoing arrangement of the light receiving amplifying device, it is possible to obtain a sufficient operational range with respect to the DC component of the light signal current ($I_{PD}$), while forming the low frequency current bypass circuit in a simple circuit arrangement of the MOS transistor.

The transconductance amplifier is preferably composed of a plurality of diodes or transistors.

With the foregoing arrangement, it is possible to expand an operational range of the transconductance amplifier, while forming the low frequency current bypass circuit in a simple circuit arrangement, and it is also possible to expand an operational range of the low frequency current bypass circuit. Furthermore, with the present invention, it is possible to form the light receiving amplifying device in a relatively simple circuit arrangement. Additionally, due to the simplicity of the circuit arrangement, the device can be realized with substantially no increase in the cost or the size.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light receiving amplifying device, comprising:
   a light receiving device for outputting a light signal current which varies with a quantity of received light;
   a load resistor, connected with said light receiving device in series, for generating a detected voltage which varies with the light signal current;
   a low frequency current bypass circuit, being connected with said load resistor in parallel and exhibiting a high input impedance with respect to the detected voltage in a high frequency band, for preventing the detected voltage in a low frequency band from being saturated;
   a transimpedance amplifying circuit for transforming an impedance of the detected voltage; and
   a capacitor for coupling said low frequency current bypass circuit and said transimpedance amplifying circuit.

2. The light receiving amplifying device as set forth in claim 1, wherein said low frequency current bypass circuit includes a low-pass filter circuit and a transconductance amplifier having a conductance.

3. The light receiving amplifying device as set forth in claim 2, wherein:
   said low-pass filter circuit is connected with said transconductance amplifier in parallel; and
   said transconductance amplifier gradually changes the conductance in accordance with the detected voltage.

4. The light receiving amplifying device as set forth in claim 2, wherein:
   said low-pass filter circuit is connected with said transconductance amplifier in parallel;
   said low-pass filter circuit is composed of a first resistor and a capacitor, said first resistor and said capacitor being connected in series;
   said transconductance amplifier is composed of a first bipolar transistor and a second resistor, said first bipolar transistor and said second resistor being connected in series; and
   a node at which said first resistor and said capacitor of said low-pass filter circuit are connected with each other is connected with a base of said first bipolar transistor.

5. The light receiving amplifying device as set forth in claim 2, wherein:

said low-pass filter circuit is connected with said transconductance amplifier in parallel;

said low-pass filter circuit is composed of a first resistor and a capacitor, said first resistor and said capacitor being connected in series;

said transconductance amplifier is composed of a MOS transistor; and a node at which said first resistor and said capacitor of said low-pass filter circuit are connected with each other is connected with a gate of said MOS transistor.

6. The light receiving amplifying device as set forth in claim 4, wherein said transconductance amplifier further includes a first diode and a third resistor which are connected in series, said first diode and third resistor being connected with said second resistor in parallel.

7. The light receiving and amplifying device as set forth in claim 6, wherein said transconductance amplifier further includes a plurality of diodes and a fourth resistor connected in series, said diodes and fourth resistor being connected with said second resistor in parallel.

8. The light receiving amplifying device as set forth in claim 4, wherein said transconductance amplifier further includes a second bipolar transistor and a third resistor which are connected in series, said second bipolar transistor and third resistor being connected with said second resistor in parallel.

9. The light receiving amplifying device as set forth in claim 8, wherein said transconductance amplifier further includes a plurality of bipolar transistors and a fourth resistor connected in series, said bipolar transistors and fourth resistor being connected with said second resistor in parallel.

10. The light receiving amplifying device as set forth in claim 4, wherein said transimpedance amplifying circuit has an inverting input terminal, a non-inverting input terminal, and an output terminal, said non-inverting input terminal being grounded, said inverting input terminal and said output terminal being connected with each other with a resistor provided therebetween.

11. A light receiving amplifying device including a light receiving device for generating a light signal current and a circuit for amplifying the light signal current, wherein:

said circuit for amplifying the light signal current includes a low frequency current bypass circuit and a transimpendance amplifying circuit; and said light receiving device is connected with a load resistor in series, so that the light signal current is converted to a voltage by said load resistor and is supplied to said low frequency current bypass circuit, exhibiting a high input impedance with respect to the voltage in a high frequency band, for preventing the voltage in a low frequency band from being saturated, with an output of said low frequency current bypass circuit being supplied to said transimpedance amplifying circuit through a capacitor.

12. The light receiving amplifying device as set forth in claim 11, wherein:

said low frequency current bypass circuit includes a low-pass filter circuit having input and output terminals and a transconductance amplifier having an inverting input terminal and an output terminal, and the output terminal of said low-pass filter circuit is connected with the inverting input terminal of said transconductance amplifier, and the output terminal of said transconductance amplifier is connected with the input terminal of said low-pass filter circuit, so that an input impedance of said low-pass filter circuit is low with respect to an input thereto in a low frequency band.

13. The light receiving amplifying device as set forth in claim 12, wherein:

said low-pass filter circuit is an RC low-pass filter circuit composed of a resistor and a capacitor; and said transconductance amplifier is composed of at least one bipolar transistor and a resistor.

14. The light receiving amplifying device as set forth in claim 12, wherein:

said low-pass filter circuit is an RC low-pass filter circuit composed of a resistor and a capacitor; and said transconductance amplifier is composed of a MOS transistor.

15. The light receiving amplifying device as set forth in claim 12, wherein said transconductance amplifier is composed of a plurality of diodes or transistors.

16. A light receiving amplifying device, comprising:

a light receiver, adapted to receive light and output a light signal current varying in accordance with the received light;

a load resistor, connected in series with the light receiver, adapted to generate a voltage varying in accordance with the light signal current;

a low frequency current bypass circuit, connected in parallel with the load resistor and including a low pass filter circuit and a transconductance amplifier having a conductance, adapted to prevent the generated voltage from being saturated by varying its input impedance in accordance with a frequency of the generated voltage;

a transimpendance amplifying circuit, adapted to transform an impedance of the detected voltage; and a capacitor, coupling the low frequency current bypass circuit and the transimpedance amplifying circuit.

17. The light receiving amplifying device of claim 16, wherein the low frequency bypass circuit exhibits a high input impedance with respect to a generated voltage in a high frequency band and exhibits a low input impedance with respect to a generated voltage in a low frequency band.

18. The light receiving amplifying device as set forth in claim 16, wherein:

said low-pass filter circuit is connected with said transconductance amplifier in parallel; and said transconductance amplifier gradually changes the conductance in accordance with the generated voltage.

19. The light receiving amplifying device as set forth in claim 16, wherein:

said low-pass filter circuit is connected with said transconductance amplifier in parallel;

said low-pass filter circuit is composed of a first resistor and a capacitor, said first resistor and said capacitor being connected in series;

said transconductance amplifier is composed of a first bipolar transistor and a second resistor, said first bipolar transistor and said second resistor being connected in series; and a node at which first resistor and said capacitor of said low-pass filter circuit are connected with each other is connected with a base of said first bipolar transistor.

20. The light receiving amplifying device as set forth in claim 16, wherein:
    said low-pass filter circuit is connected with said transconductance amplifier in parallel;
    said low-pass filter circuit is composed of a first resistor and a capacitor, said first resistor and said capacitor being connected in series;
    said transconductance amplifier is composed of a MOS transistor; and
    a node at which said first resistor and said capacitor of said low-pass filter circuit are connected with each other is connected with a gate of said MOS transistor.

* * * * *